US008365969B2

(12) United States Patent
Johnson (10) Patent No.: US 8,365,969 B2
(45) Date of Patent: Feb. 5, 2013

(54) MOBILE CARRIER (76) Inventor: Larry A. Johnson, Spokane Valley, WA (US)

(*) Notice: Subject to any disclaimer, the term of this patent is extended or adjusted under 35 U.S.C. 154(b) by 636 days.

(21) Appl. No.: 12/539,704

(22) Filed: Aug. 12, 2009

(65) Prior Publication Data
US 2010/0170924 A1 Jul. 8, 2010

Related U.S. Application Data (60) Provisional application No. 61/143,305, filed on Jan. 8, 2009.

(51) Int. Cl.
B62J 7/00 (2006.01)
B62J 9/00 (2006.01)
B62J 11/00 (2006.01)
A45F 4/02 (2006.01)
B62B 1/00 (2006.01)
B62B 3/00 (2006.01)
B62B 5/00 (2006.01)
B62B 7/00 (2006.01)
B62B 9/00 (2006.01)
A45C 7/00 (2006.01)
A45C 9/00 (2006.01)
A45C 13/03 (2006.01)

(52) U.S. Cl. ........ 224/413; 224/446; 224/501; 224/428; 224/432; 224/452; 224/453; 224/454; 224/455; 224/456; 224/457; 224/320; 224/552; 224/509; 224/416; 224/417; 224/447; 224/450; 224/153; 280/651; 280/654; 280/655; 190/15 R; 190/18 A; 190/18 R; 190/14; 190/22

(58) Field of Classification Search .................. 224/413, 224/428, 432, 446, 452–457, 320, 552, 447, 224/450, 416, 417, 501, 509, 498, 497, 495, 224/42.33, 42.34, 42.36, 551, 153; 280/651, 280/654, 655; 190/18 A, 18 R, 15 R; B62J 7/02
See application file for complete search history.

(56) References Cited

U.S. PATENT DOCUMENTS

| 2,448,591 | A | * | 9/1948 | Harder | 414/462 |
| 2,536,570 | A | * | 1/1951 | Rehn | 224/446 |
| 5,009,337 | A | * | 4/1991 | Bimbi | 224/400 |
| 5,054,426 | A | * | 10/1991 | Panarelli et al. | 119/473 |
| 5,114,060 | A | * | 5/1992 | Boyer | 224/413 |
| 5,135,143 | A | * | 8/1992 | Naughton | 224/416 |
| 5,207,361 | A | | 5/1993 | Slifka | |
| 5,217,149 | A | * | 6/1993 | Simonett | 224/446 |
| 5,251,796 | A | * | 10/1993 | Shelhart | 224/454 |
| 5,609,278 | A | * | 3/1997 | Fresco | 224/153 |
| 6,186,729 | B1 | * | 2/2001 | Sargent | 414/462 |
| 6,345,749 | B1 | * | 2/2002 | Hamilton | 224/509 |
| 6,484,913 | B1 | * | 11/2002 | Hancock et al. | 224/401 |
| 6,619,522 | B2 | | 9/2003 | Schurr | |
| 6,857,839 | B2 | * | 2/2005 | Pitoniak | 414/462 |
| 7,143,912 | B2 | * | 12/2006 | Caneba | 224/153 |
| 7,147,243 | B2 | * | 12/2006 | Kady | 280/655 |
| 7,341,270 | B1 | * | 3/2008 | Scholz | 280/287 |
| 2002/0121535 | A1 | * | 9/2002 | Moore et al. | 224/427 |

* cited by examiner

Primary Examiner — Nathan J Newhouse
Assistant Examiner — Derek Battisti
(74) Attorney, Agent, or Firm — Dale J. Ream (57) ABSTRACT A mobile carrier includes a generally planar cargo platform. The mobile carrier includes first and second opposed side rails, each side rail having a portion extending outwardly from the cargo platform, the opposed side rails being adjustably coupled to the cargo platform such that multiple distances between the outwardly extending portion of each side rail may be respectively maintained. The mobile carrier includes first and second opposed end rails, each end rail having a portion extending outwardly from the cargo platform, the opposed end rails being adjustably coupled to the cargo platform such that multiple distances between the outwardly extending portion of each end rail may be respectively maintained. The mobile carrier includes a rod. A receiving structure is configured to maintain the rod at multiple respective positions relative to the receiving structure, the rod and the receiving structure being separable from one another.

9 Claims, 9 Drawing Sheets

MOBILE CARRIER

RELATED APPLICATIONS

This application is a non-provisional patent application that claims the priority of Provisional patent application 61/143,305 that was filed on Jan. 8, 2009 titled Easy Rider Bag Caddy.

BACKGROUND OF THE INVENTION

This invention relates generally to cargo carriers for vehicles and, more particularly, to a mobile carrier particularly adapted for elongate cargo carried by a motorcycle.

A major disadvantage of riding a motorcycle as a means of transportation is the difficulty in transporting cargo. In particular, transporting elongate recreational items such as a golf bag and golf clubs is difficult due to both the size and the awkward configuration of such cargo. The inability to transport a golf bag is especially disappointing where transportation options that are less expensive than full size automobiles, e.g. a motorcycle, is more desirable during periods of overall economic downturn.

Various devices have been proposed in the art that mount to a motorcycle for transporting a golf bag, such as U.S. Pat. No. 6,619,522 to Schurr and U.S. Pat. No. 3,286,891 to Jones. Although assumably effective for their intended purposes, the existing devices present a longitudinal orientation that does not provide a full range of articulation without interference with the seat and require a fender mount for stability.

Therefore, it would be desirable to have a mobile carrier for a motorcycle that overcomes the disadvantages specifically identified above.

SUMMARY OF THE INVENTION

A mobile carrier according to a preferred embodiment of the present invention includes a generally planar cargo platform. The mobile carrier includes first and second opposed side rails, each side rail having a portion extending outwardly from the cargo platform, the opposed side rails being adjustably coupled to the cargo platform such that multiple distances between the outwardly extending portion of each side rail may be respectively maintained. The mobile carrier includes first and second opposed end rails, each end rail having a portion extending outwardly from the cargo platform, the opposed end rails being adjustably coupled to the cargo platform such that multiple distances between the outwardly extending portion of each end rail may be respectively maintained. The mobile carrier includes a rod. A receiving structure is configured to maintain the rod at multiple respective positions relative to the receiving structure, the rod and the receiving structure being separable from one another.

Therefore, a general object of this invention is to provide a mobile carrier for use on a motorcycle that selectively holds an elongate cargo item such as a golf bag.

Another object of this invention is to provide a mobile carrier, as aforesaid, that is adjustable to multiple rotary positions.

Still another object of this invention is to provide a mobile carrier, as aforesaid, that is adjustable to multiple positions along a longitudinal axis.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

A mobile carrier 100 for use with a motorcycle or bicycle will now be described in detail with reference to FIG. 1 through FIG. 9 of the accompanying drawings. More particularly, a mobile carrier 100 of one embodiment includes a cargo platform 110, first and second opposed side rails 122, 124, first and second opposed end rails 132, 134, a rod 140, and a receiving structure 150. It should be appreciated that "motorcycle" and "bicycle" as used herein should be interpreted broadly to include vehicles having different numbers of wheels and different methods of propulsion.

As shown in FIG. 1 through FIG. 4, the first and second side rails 122, 124 each have an attachment portion 122b, 124b and a cargo portion 122a, 124a extending outwardly from the cargo platform 110, and the first and second side rails 122, 124 are adjustably coupled to the cargo platform 110 such that multiple distances between the cargo portions 122a, 124a may be respectively maintained. For example, attachment portions 122b, 124b of the side rails 122, 124 may interact with complementary receiving shafts 112 of the cargo platform 110 such that the distance between the portions 122a, 124a may be telescopically expanded and contracted. Pins 113, clamps, or other fastening devices may be used to maintain the side rails 122, 124 at the various positions (e.g., by being coupled to the shafts 112 and passing through holes 123 in the shafts 122b, 124b).

The cargo portions 122a, 124a extend outwardly from opposed the cargo platform 110 in a first direction to define an area 115 (FIG. 1) bounded by the cargo platform 110 (which may be generally planar, as shown, or which may be arcuate or various other shapes) and the portions 122a, 124a. Means for securing cargo in the area 115 may be included. For example, at least one strap 127 (FIG. 1), rail, or other restraining element may span the portions 122a, 124a or otherwise restrict cargo from leaving the area 115.

Again turning to FIGS. 1 through FIG. 4, the first end rail 132 has a distal cargo portion 132a and the second end rail 134 has a cargo portion 134a extending outwardly from the cargo platform 110. The end rails 132, 134 may also include attachment shafts 132b, 134b movably coupled to respective receiving shafts 114 of the platform 110. The first and second end rails 132, 134 are adjustably coupled to the cargo platform 110 such that multiple distances between the portions 132a, 134a may be respectively maintained. For example, attachment shafts 132b, 134b of the end rails 132, 134 may interact with complementary receiving shafts 114 of the cargo platform 110 such that the distance between the portion 132a, 134a may be telescopically expanded and contracted. Pins 116 (FIG. 5b), clamps, or other fastening devices may be used to maintain the end rails 132, 134 at the various positions (e.g., by being coupled to the shafts 114 and passing through holes 133 in the shafts 132b, 134b).

Figure 1:
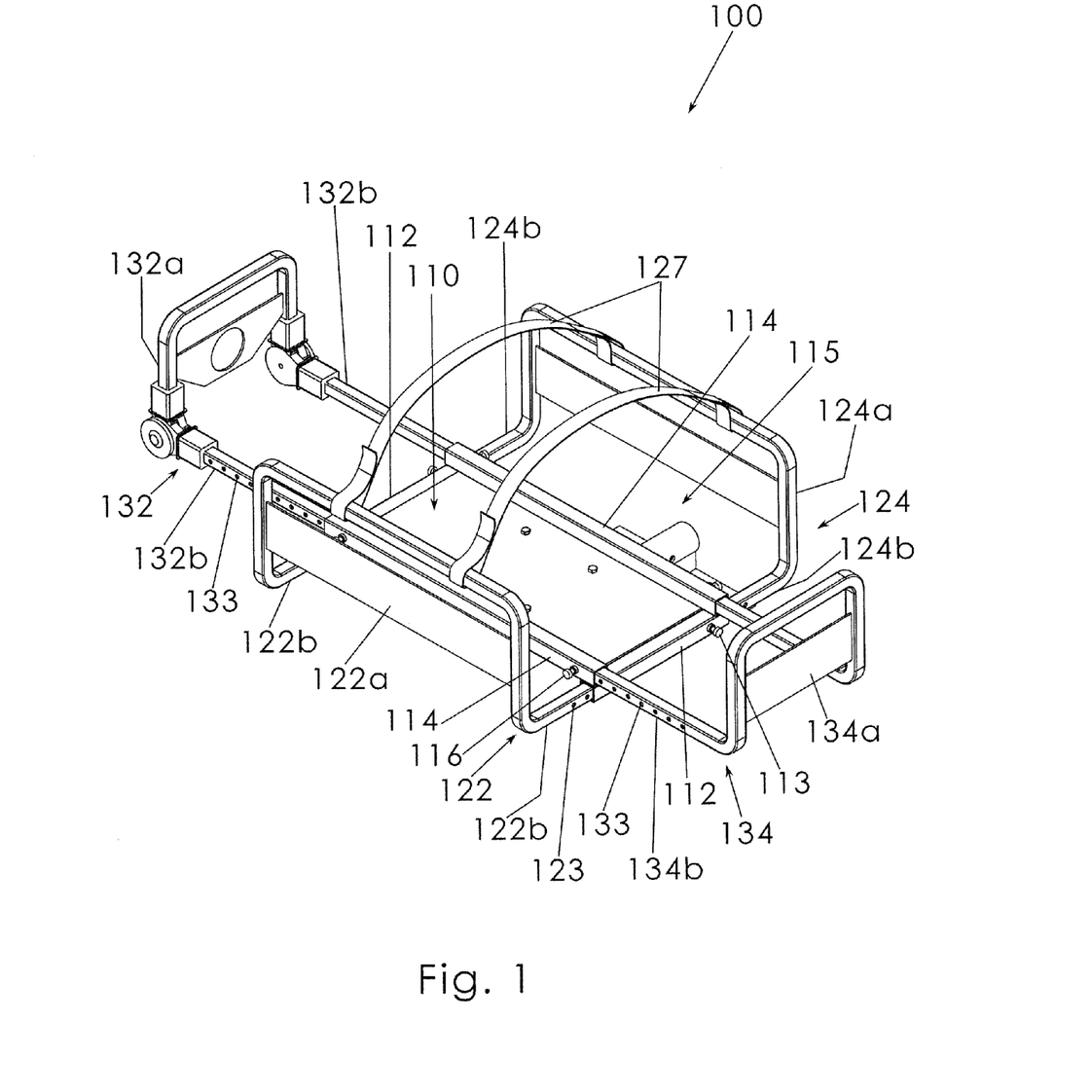
FIG. 1 is a perspective view of a mobile carrier according to one embodiment of the present invention.
Figure 2:
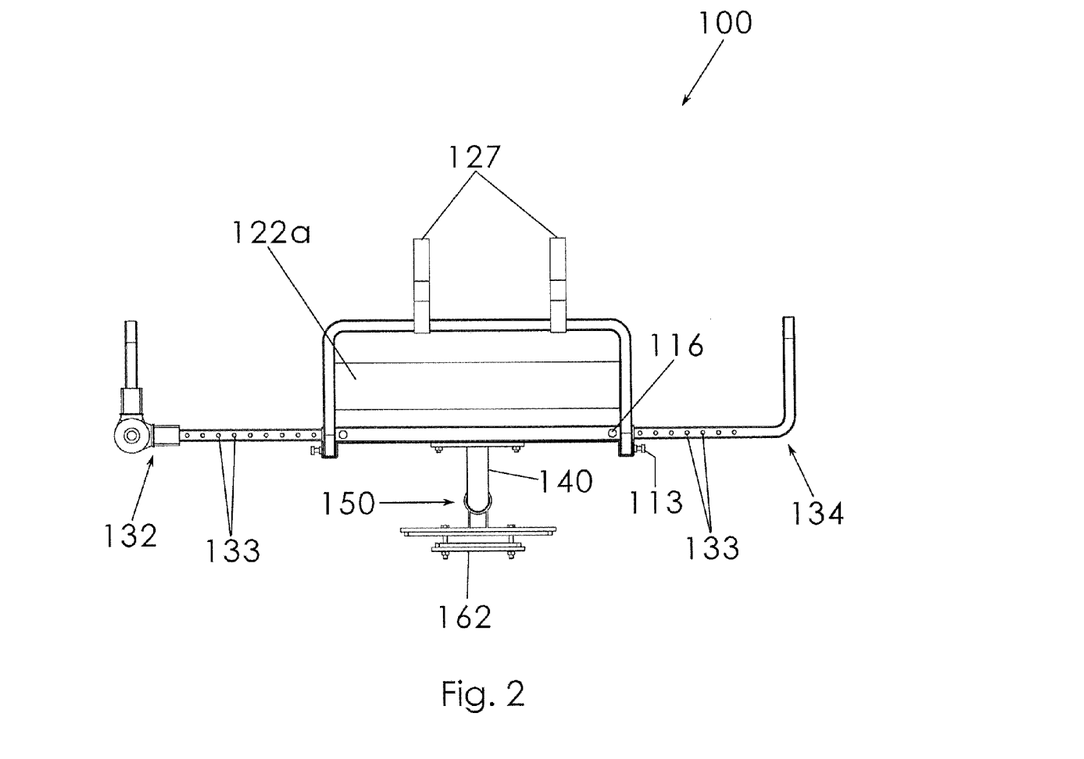
FIG. 2 is side view of the mobile carrier as in FIG. 1.
Figure 3A:
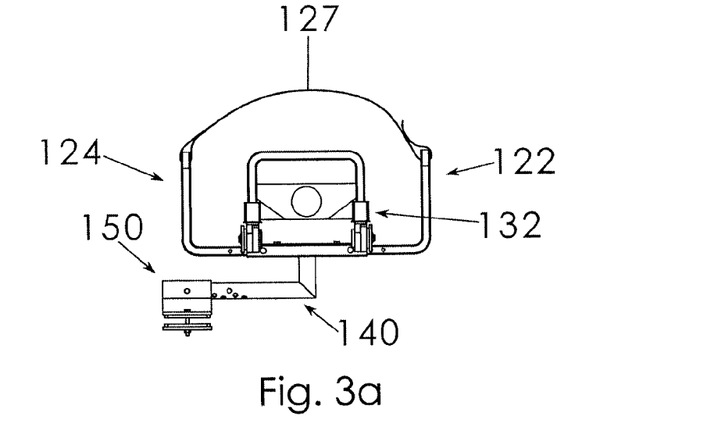
FIG. 3a is an end view of the mobile carrier as in FIG. 1.
Figure 3B:
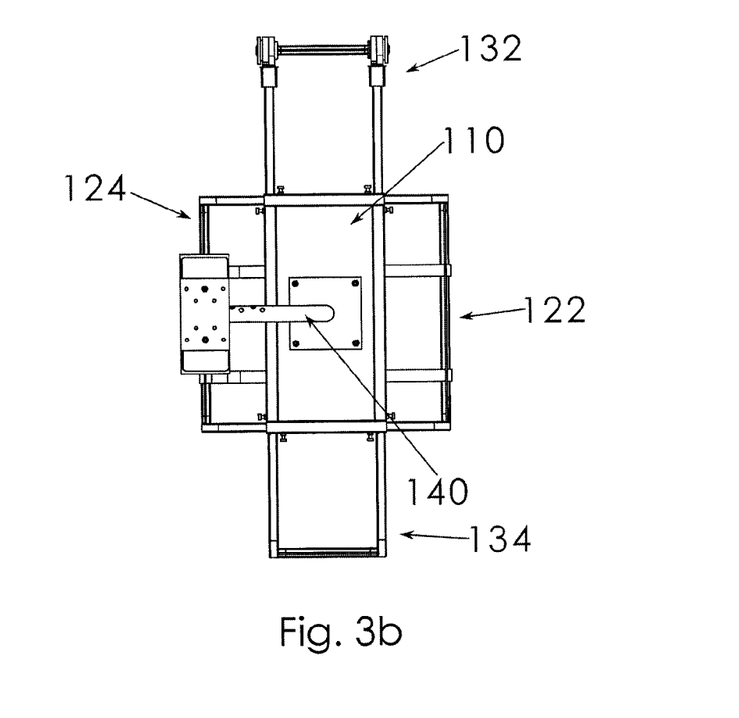
FIG. 3b is bottom view of the mobile carrier as in FIG. 1.
Figure 4:
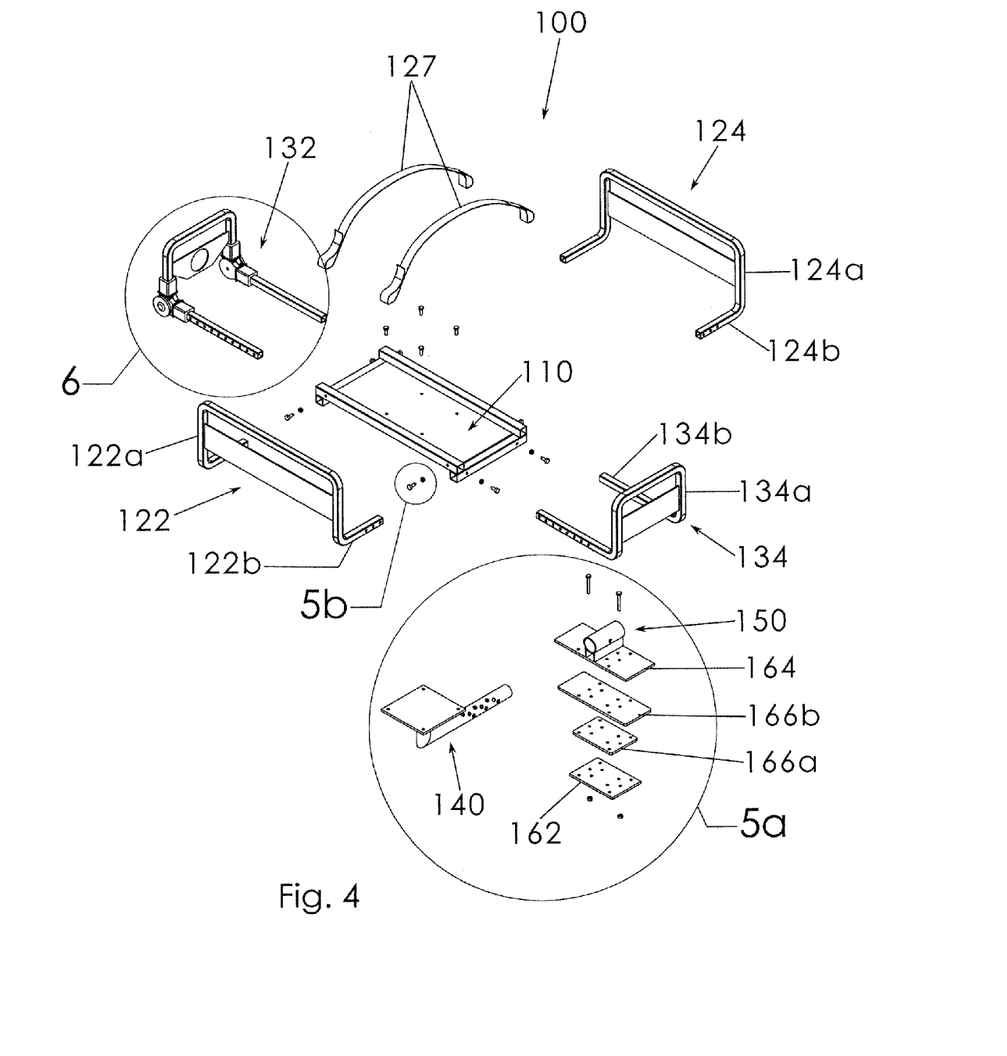
FIG. 4 is an exploded view of the mobile carrier as in FIG. 1.
Figure 6:
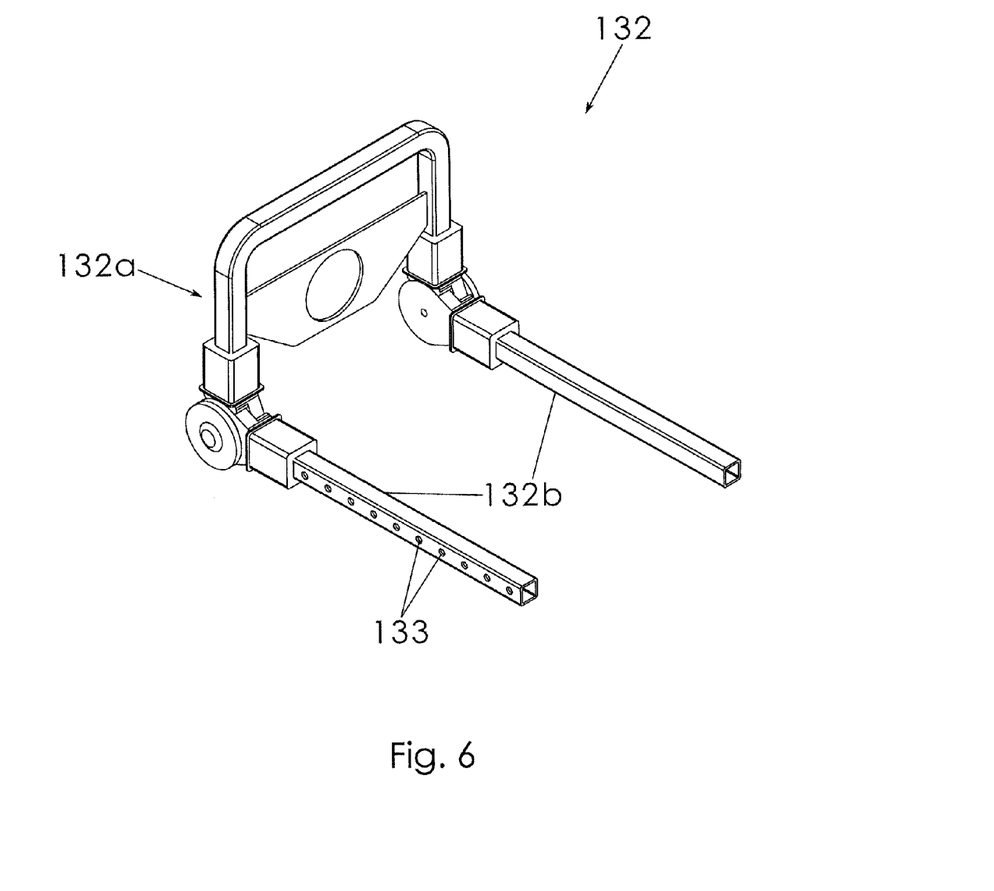
FIG. 6 is a perspective view of an end rail removed from the carrier.
Figure 7:
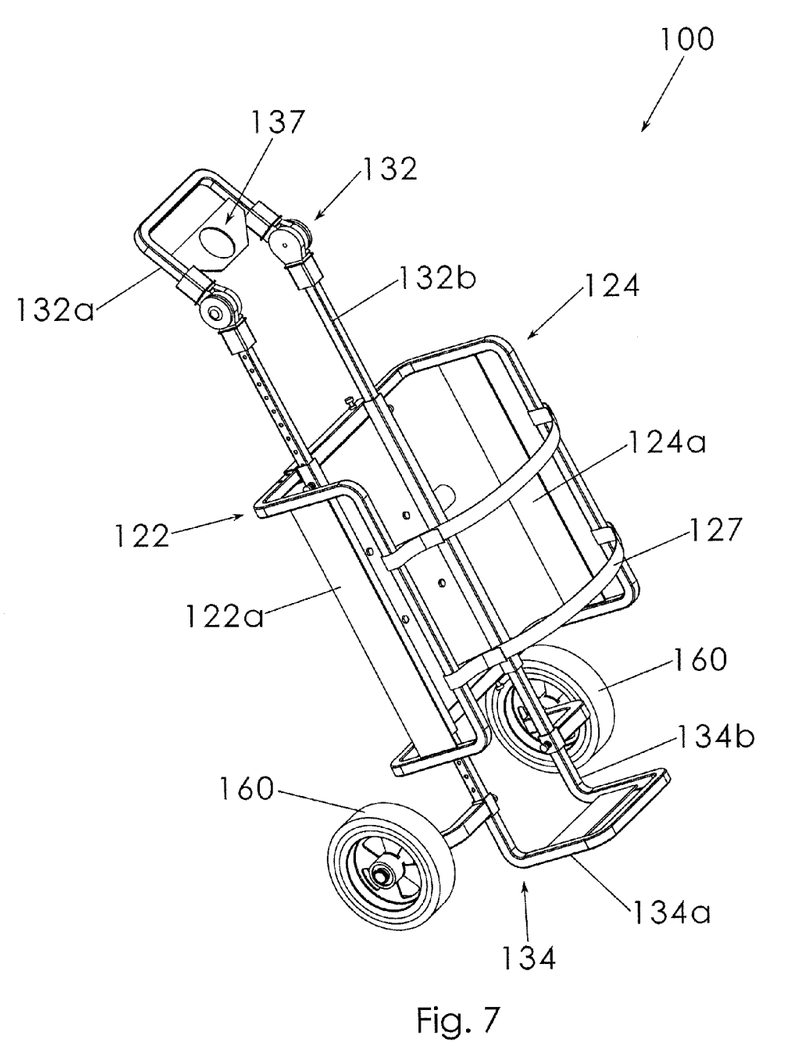
FIG. 7 is a perspective view of another embodiment of a mobile carrier according to the present invention.

The cargo portion 134a of the second end rail 134 extends outwardly from the cargo platform 110 in the first direction to further define the area 115 (FIG. 1), and the cargo portion 132a of the first end rail 132 may also extend outwardly from the cargo platform 110 in the first direction (FIG. 1). As shown in FIG. 1, FIG. 6, and FIG. 7, the distal portion 132a of the first end rail 132 may include an end portion be movable from extending in the first direction (FIG. 1 and FIG. 6) to extending in an opposed second direction (FIG. 7). More particularly, the distal portion 132a may be referred to as an end portion that is rotatable between a first configuration parallel to the cargo platform 110 (FIG. 7) and a second configuration generally perpendicular to the cargo platform 110 (FIG. 1).

At least one wheel 160 may be permanently or removably coupled to the cargo platform 110 and/or the second end rail 134 to interact with a ground surface (not shown) when the first end rail 132 is elevated above the second end rail 134, as shown in FIG. 7. And, as shown in FIG. 7, the distal portion 132a of the first end rail 132 may include a cup holder 137 that is accessible when the distal portion 132a extends in the second direction.

Figure 5A:
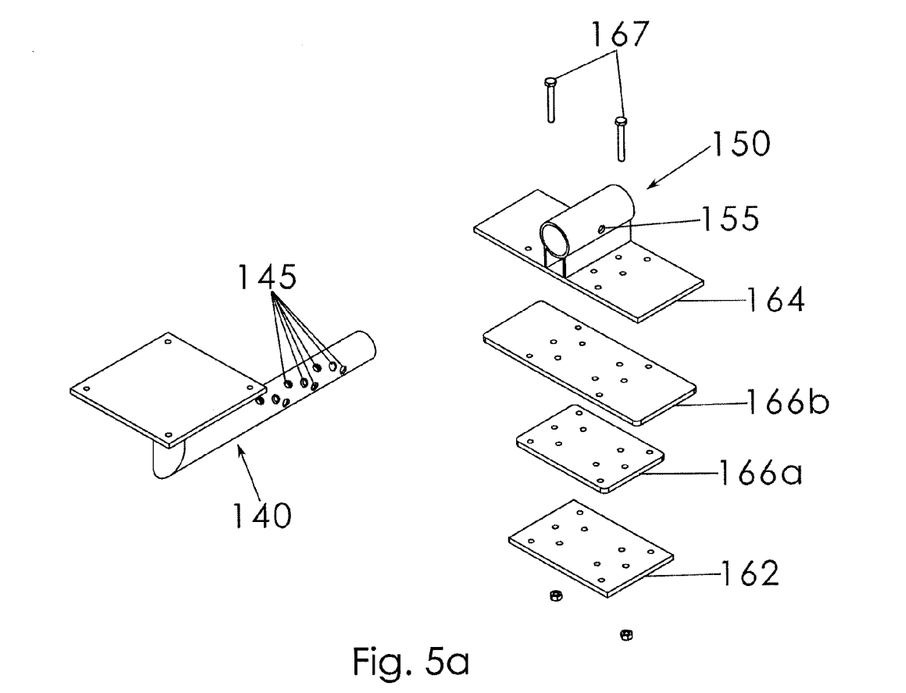
FIG. 5a is an isolated view on an enlarged scale taken from FIG. 4.
Figure 5B:
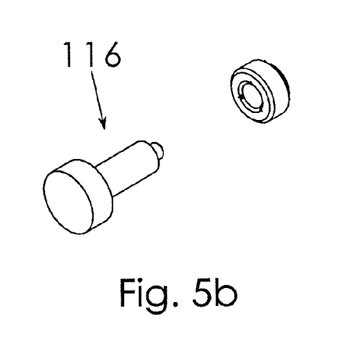
FIG. 5b is an isolated view on an enlarged scale taken from FIG. 4.
Figure 8A:
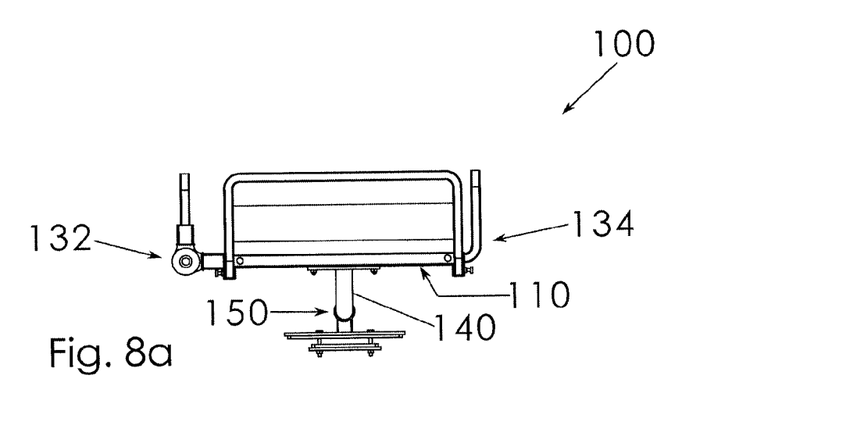
FIGS. 8a to 8c show the rod being adjusted to various positions.
Figure 8B:
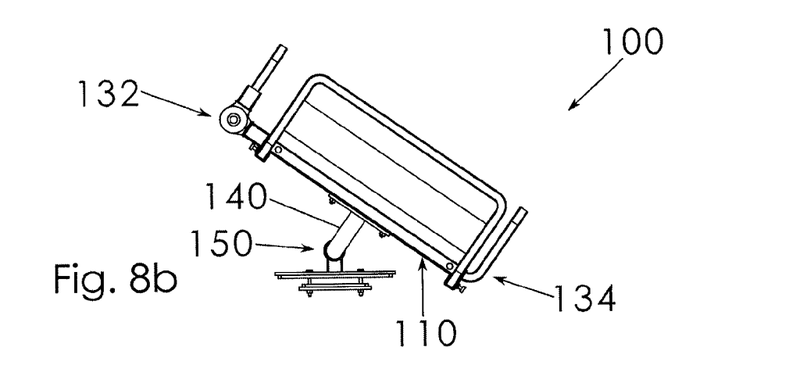
Figure 8C:
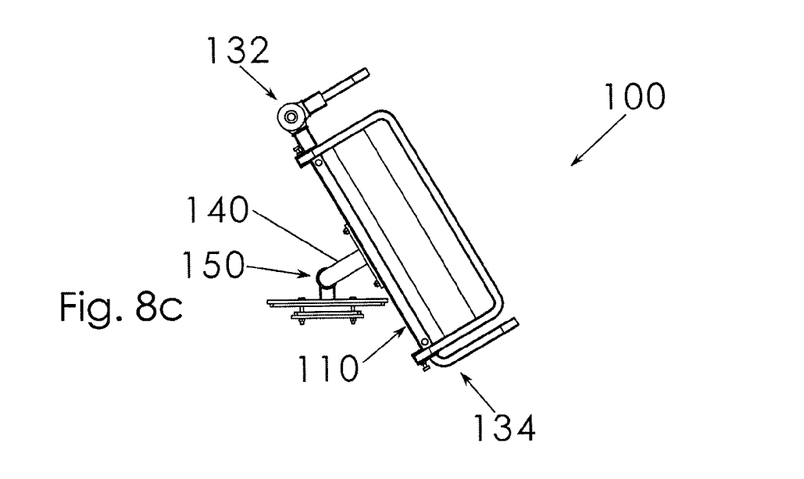
Figure 9:
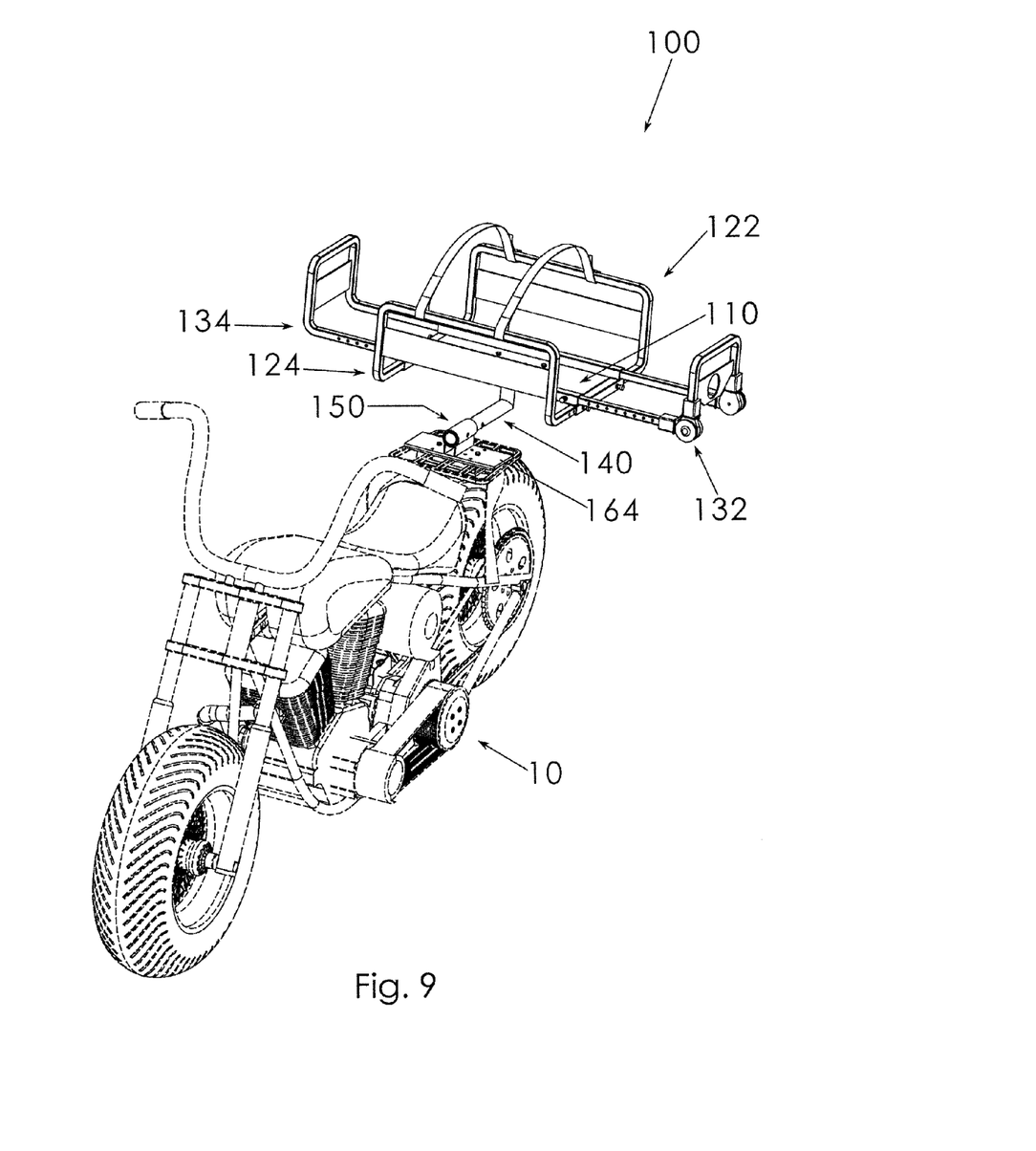
FIG. 9 is an illustration of the mobile carrier mounted to a motorcycle.

Turning now to FIGS. 2, 3a, 3b, 5a, and 8a through 9, the receiving structure 150 is configured to maintain the rod 140 at multiple respective positions relative to the receiving structure 150 (e.g., the positions shown in FIGS. 8a through 8c). For example, either the rod 140 or the receiving structure 150 may have a plurality of holes, and both the rod 140 and the receiving structure 150 may have at least one hole 145, 155. As such, the rod 140 may be maintained in the various positions by a pin passing through the holes 145, 155. The rod 140 and the receiving structure 150 are separable from one another, and either the rod 140 or the receiving structure 150 is operatively coupled to the cargo platform 110. In the embodiment shown in the accompanying drawings, the rod 140 is operatively coupled to the cargo platform 110 and means (e.g., plates 162, 164, gaskets 166a, 166b, and fasteners 167) are included for coupling the receiving structure 150 to the motorcycle or bicycle 10 (FIG. 5a and FIG. 9).

In use, the receiving structure 150 is coupled to the motorcycle or bicycle 10 (FIG. 9) by the plates 162, 164, gaskets 166a, 166b, and fasteners 167 (FIG. 5a). The rod 140 is coupled to the receiving structure 150 and is maintained at the desired position (e.g., positions shown in FIGS. 8a, 8b, and 8c) by passing a pin through the holes 145, 155. The side rails 122, 124 and the end rails 132, 134 may be adjusted, as discussed above, such that the area 115 is sized as desired. The distal portion 132a of the first end rail 132 may extend in the first direction (FIG. 1), cargo may be placed in the area 115, and the cargo may be secured in the area 115 by the straps 127.

In an alternate method of use, the rod 140 may be separated from the receiving structure 150, the distal portion 132a of the first end rail 132 may extend in the second direction (FIG. 7), and the mobile carrier 100 may be used as a dolly or hand truck employing the wheel(s) 160 (FIG. 7). In such a use, the distal portion 132a may act as a handle. Again, the side and end rails 122, 124, 132, 134 may be adjusted such that the area 115 is sized as desired. In some embodiments, the area 115 is sized to hold a bag of golf clubs.

It is understood that while certain forms of this invention have been illustrated and described, it is not limited thereto except insofar as such limitations are included in the following claims and allowable functional equivalents thereof.

The invention claimed is:

1. A mobile carrier, comprising:
a generally planar cargo platform having a pair of side rail receiving shafts and a pair of end rail receiving shafts;
first and second opposed side rails, each side rail having an attachment portion movably coupled to a respective side rail receiving shaft and a cargo portion extending outwardly from opposed sides of said cargo platform, said opposed side rails being adjustably coupled to said opposed sides of said cargo platform such that multiple distances between said outwardly extending cargo portion of each side rail may be respectively maintained;
first and second opposed end rails coupled to respective end rail shafts, each end rail having an attachment portion movably coupled to a respective end rail receiving shaft and a cargo portion extending outwardly from opposed ends of said cargo platform, said opposed end rails being adjustably coupled to said opposed ends of said cargo platform such that multiple distances between said outwardly extending portion of each end rails may be respectively maintained;
wherein said first and second side rails are movable in directions associated with a width and said first and second end rails are movable in directions associated with a length, said first and second side rails being perpendicular to said first and second end rails;
a rod; and
a receiving structure configured to maintain said rod at multiple respective positions relative to said receiving structure, said rod and said receiving structure being separable from one another, one of said rod and said receiving structure being operatively coupled to said cargo platform.

2. The mobile carrier of claim 1, wherein
said first end rail includes an end portion that is rotatable between a first configuration generally parallel to said cargo platform and a second configuration parallel to said cargo platform.

3. The mobile carrier of claim 2, further comprising at least one wheel operatively coupled to said second end rail to interact with a ground surface when said first end rail is elevated above said second end rail.

4. The mobile carrier of claim 3, wherein said first end rail end portion includes a cup holder accessible when said first end rail extends in said second direction.

5. The mobile carrier of claim 4, further comprising means for securing cargo in an area bounded by said cargo platform, said cargo portion of each first side rail, and said cargo portion of each second side rail.

6. The mobile carrier of claim 5, wherein:
one of said rod and said receiving structure has a plurality of holes;
the other of said rod and said receiving structure has at least one hole;
said rod is maintained in said respective positions by a pin passing through respective said holes in said rod and said receiving structure.

7. The mobile carrier 1, further comprising means for securing cargo in an area bounded by said cargo platform, said cargo portion of each first side rail, and said cargo portion of each second side rail.

8. The mobile carrier of claim 7, wherein:
one of said rod and said receiving structure has a plurality of holes;
the other of said rod and said receiving structure has at least one hole;
said rod is maintained in said respective positions by a pin passing through respective said holes in said rod and said receiving structure.

9. The mobile carrier of claim 1, wherein:
each attachment portion of said first and second side rails is perpendicular to each cargo portion of said first and second side rail, respectively; and
each attachment portion of said first and second end rails is perpendicular to each cargo portion of said first and second end rail, respectively.

\* \* \* \* \*